United States Patent [19]

McCullough

[11] Patent Number: 5,487,530
[45] Date of Patent: Jan. 30, 1996

[54] SHOVELING AID

[76] Inventor: Harold J. McCullough, 16238-56th Avenue, R.R. #10, Surrey. British Columbia, Canada, V3S 8E7

[21] Appl. No.: 197,517

[22] Filed: Feb. 16, 1994

[51] Int. Cl.⁶ ........................................................ A01B 1/02
[52] U.S. Cl. ........................................ 254/131.5; 294/59
[58] Field of Search .......................... 294/49, 54.5, 59; 37/265, 285, 434; 254/131.5, 132

[56] References Cited

U.S. PATENT DOCUMENTS

| 59,570 | 11/1866 | Elliot | 254/131.5 |
|---|---|---|---|
| 1,353,459 | 9/1920 | Dann | 254/131.5 |
| 2,470,217 | 5/1949 | McLoughlin | 294/59 X |
| 4,461,458 | 7/1984 | Poulin | 294/59 X |
| 4,881,332 | 11/1989 | Evertsen | 294/59 X |
| 5,054,278 | 10/1991 | Thorndike | 294/59 X |

FOREIGN PATENT DOCUMENTS

| 559313 | 9/1923 | France | 254/131.5 |
|---|---|---|---|
| 1035983 | 9/1953 | France | 254/131.5 |
| 76496 | 9/1961 | France | 254/131.5 |
| 3141441 | 5/1983 | Germany | 294/59 |
| 3503328 | 8/1986 | Germany | 294/59 |
| 2179831 | 3/1987 | United Kingdom | 294/59 |

*Primary Examiner*—Johnny D. Cherry

[57] ABSTRACT

A shoveling aid for a shovel includes an elongated bracing member releasably attachable to the handle of the shovel at a selected position away from the shovel blade to permit the shovel to be levered with the aid to lift a load carried by the blade. The bracing member includes a pipe section which has upper and lower openings on opposed sides. A sleeve coupled to the pipe section in the upper opening receives the handle at a predetermined angle relative to the pipe section.

3 Claims, 3 Drawing Sheets

SHOVELING AID

FIELD OF THE INVENTION

This invention relates to shovels and similar work tools. More particularly, this invention relates to a shoveling aid designed to make the use of shoveling tools less exhausting for the user.

BACKGROUND TO THE INVENTION

Gardeners and other individuals who have occasion to work with shovels find that while it is sometimes relatively easy to push or dig a shovel in the ground it can then be quite difficult to actually lift away the shoveled load. This can be a particular problem for those who are naturally weak or for those who are simply out of condition.

Normally, the lifting task is achieved by using one hand to grip the shovel handle at a point relatively low along the length of the handle, and the other hand to effectively lever the handle about that point. Concurrently, the worker lifts at the same point. If the ground load is heavy, or if it remains partly consolidated with the surrounding ground where it is situated, then the task of lifting becomes more difficult. Likewise, if the fibre of grasses, roots or other vegetation has to be pulled or broken, then the weight of the load is effectively increased and the job becomes tougher. The worker will tend to grip the handle at a lower point towards the load to reduce the moment arm represented by the load. But, this requires more stooping and bending on the part of the worker and, for some people, the work can quickly become exhausting.

Accordingly, a primary object of the present invention is to provide a shoveling aid to assist workers with the process of shoveling.

A further object of the present invention is to provide a shoveling aid which is simple in construction, portable and easy to use.

BRIEF SUMMARY OF THE INVENTION

In accordance with a broad aspect of the present invention, there is provided a shoveling aid comprising an elongated bracing member and means for releasably the member to the handle of a shovel at a selected position away from the blade or head of the shovel. When attached, the aid permits the shovel to be levered with the aid to lift a load imposed on or carried by the blade.

The bracing member includes a pipe section which has upper and lower openings on opposed sides. A sleeve coupled to the pipe section in the upper opening receives the handle at a predetermined angle relative to the pipe section.

As will be seen, a shoveling aid in accordance with the present invention may be largely fabricated from cylindrical pipe, preferably plastic pipe. This enables a structure which is not only strong and lightweight but which is also easy to construct from commercially available parts.

The foregoing and other features of the invention will now be described with reference to the drawings.

DETAILED DESCRIPTION

The Figures include the illustration of a conventional shovel partially cut-away and generally designated 100, the shovel comprising a shovel blade 200 and an elongated handle 300. Shovel 100 is not considered to be part of the invention, but is depicted in the Figures in order to better illustrate the invention and its operation.

Figure 1:
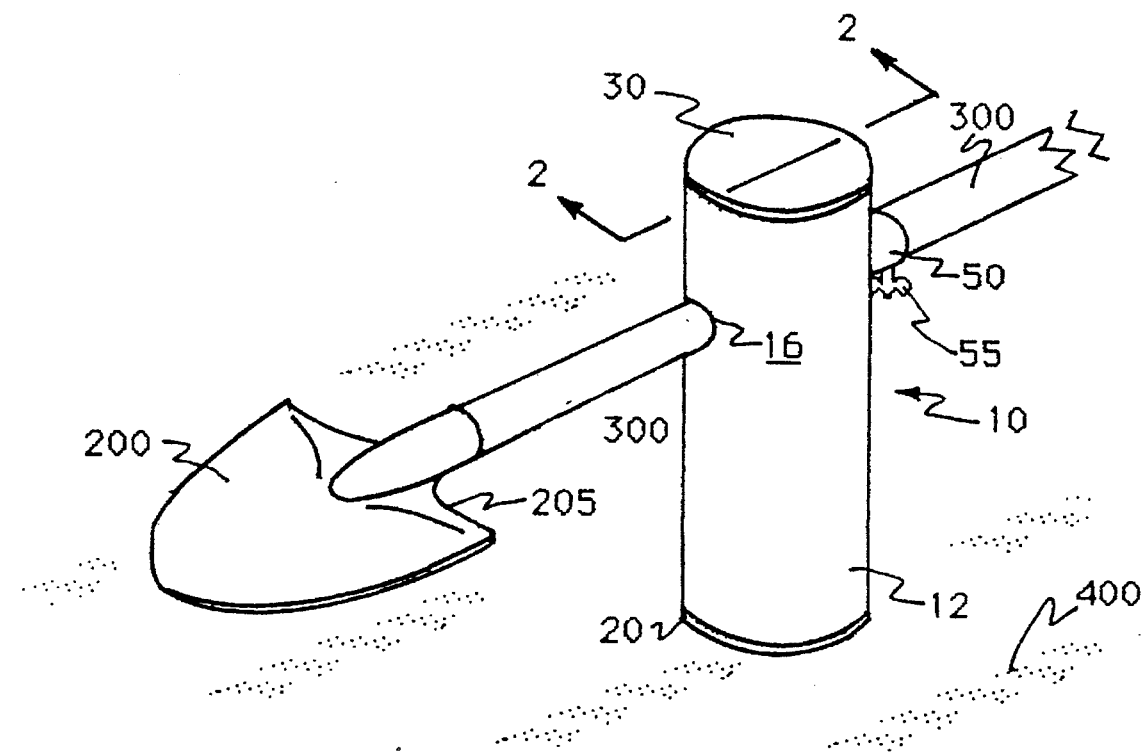
FIG. 1 is a perspective view of a shoveling aid in accordance with the present invention when connected to a shovel.
Figure 2:
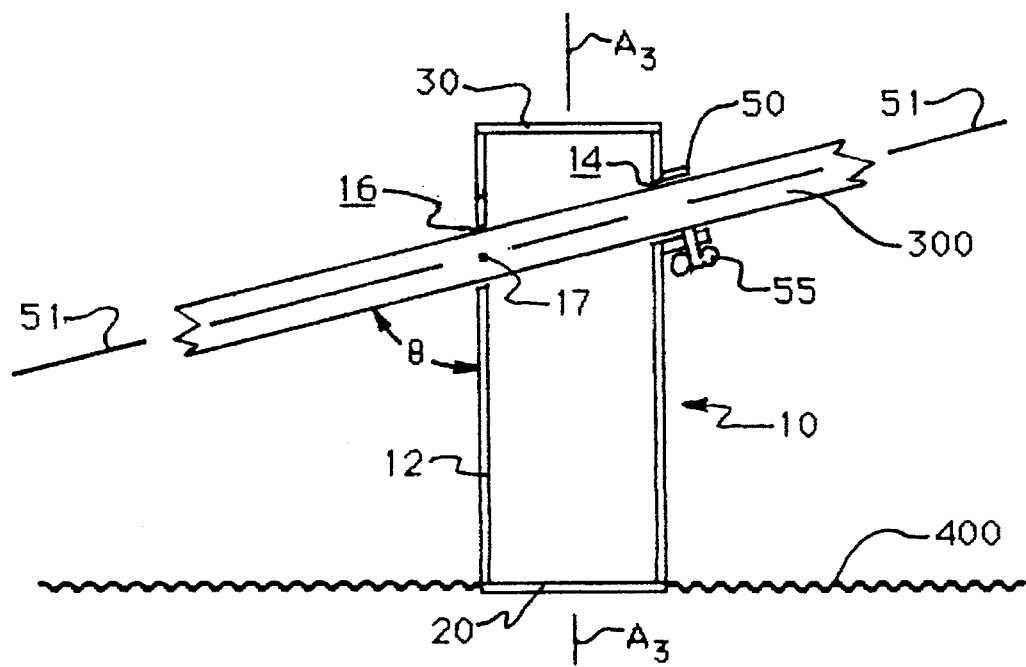
FIG. 2 is a cross-section elevation view of the shoveling aid taken along section line 2—2 in FIG. 1.

In FIGS. 1 and 2, the shoveling aid generally designated 10 comprises a cylindrical pipe section 12 extending upwardly from a base end 20 to a top end 30. Both base end 20 and top end 30 are closed to help block soil or other foreign matter from entering inside the member. In the case of base end 20, the closure also serves to provide a relatively large surface area to engage the ground 400 when the aid is in use.

Pipe section 12 serves as a bracing member. Preferably, and to minimize weight, it is formed from plastic pipe. Ends 20 and 30 are formed from plastic sheet material trimmed to the diameter of the pipe and glued in place.

As best seen in FIG. 2, pipe section 12 includes upper and lower openings 14, 16 which extend on opposed sides through the wall of the section. A plastic collar or sleeve 50 is secured at an angle in upper opening 14, the central axis 51 of the sleeve being aligned with the center 17 of lower opening 16. Opening 14 and sleeve 50 are both sized to longitudinally receive handle 300 along axis 51.

Sleeve 50, together with bolt 55 which threads through sleeve 50, provide a means for attaching pipe section 12 to handle 300 at a selected position away from blade 200. By tightening bolt 55 when handle 300 is in place, the handle is releasably secured in sleeve 50.

Figure 3:
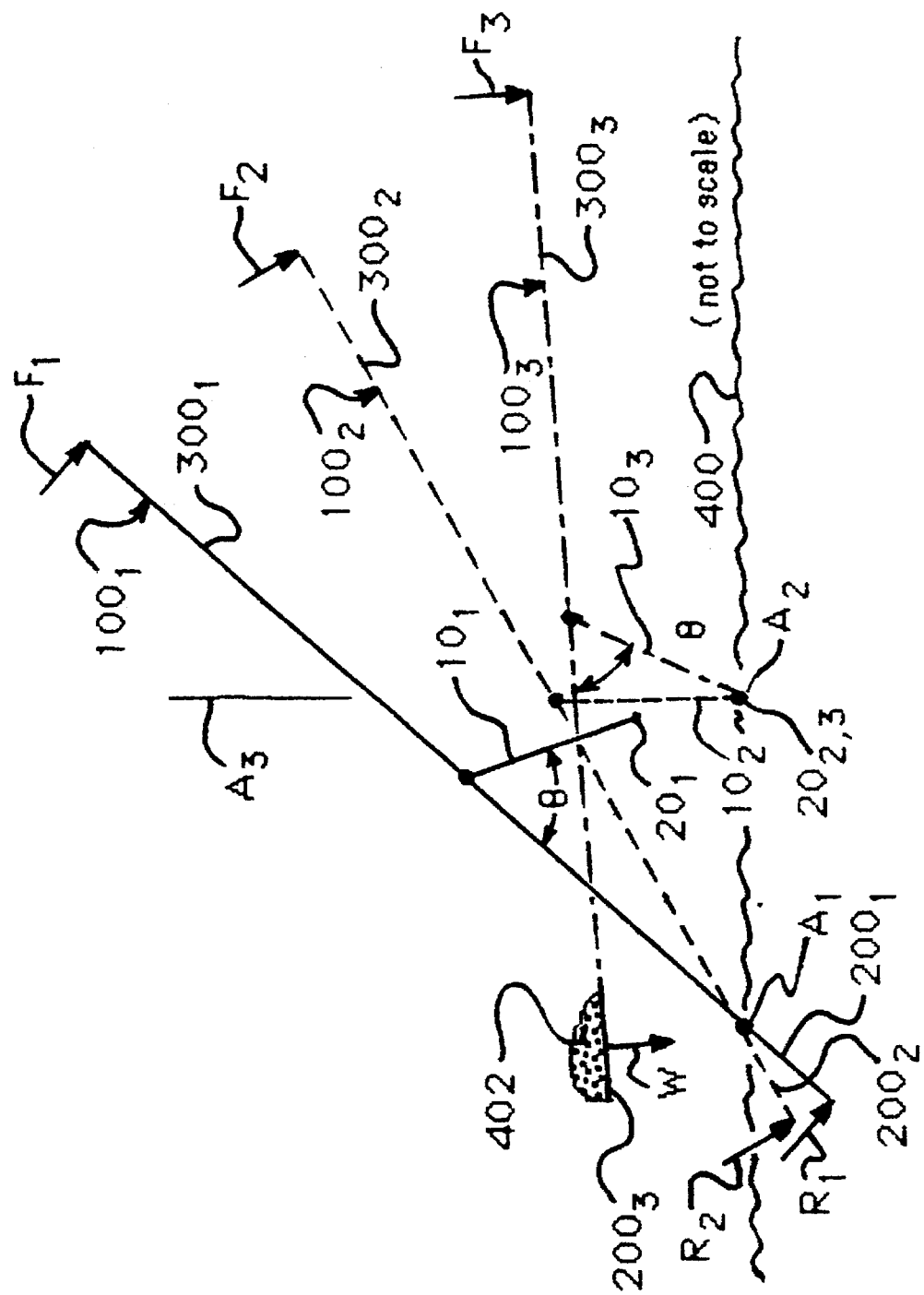
FIG. 3 is a simplified force diagram of the shovel and shoveling aid of FIG. 1 when the shovel is in first, second and third positions of usage.

A shoveling aid like that shown in FIGS. 1 and 2 has been fabricated using an approximately 13" length of 4" I.D. plastic pipe for section 12, and an approximately ¾" length of 2" I.D. plastic pipe for sleeve 50. Upper and lower openings 14, 16, each had a diameter of about 1½" to slidingly accommodate shovel handle 300; the centres of the openings being about 9¼" and 10¼", respectively, from the bottom of section 12. With such dimensions, the aid is typically attached about 6" to 8" away from blade 200 on handle 300 for best results. The positioning of holes 14, 16, predetermines that handle 300 is received at an angle of about 75° relative to section 12 (viz. 15° from horizontal when section 12 stands vertically). In FIGS. 2 and 3 the 75° angle is indicated as angle Θ.

None of the foregoing dimensions are critical. However, it should be noted that the diameter of section 12 (including end 20) strikes a compromise between the surface area of end 20 (which should be relatively large to avoid having the shoveling aid stick into the ground when force is applied) and leaving lateral clearance for the user's foot during normal digging operations. If the diameter of section 12 is too large, then it will interfere when the user tries to step on top edge 205 of shovel blade 200.

The mechanics of operation of shoveling aid 10 are illustrated in FIG. 3 which shows force diagrams for three positions of usage. To better differentiate each position, mechanical elements are shown by solid lines for the first position of usage, by dashed lines for the second position of usage, and by broken solid lines for the third position of usage. As well, subscripts 1, 2 and 3 corresponding to each position of usage have been added to the labelling of mechanical elements and forces which act on those elements.

In the first position of usage shown in FIG. 3, aid 10, is not playing an active role. It is simply being carried by handle 300$_1$ with base end 20$_1$ hanging freely above the level of ground 400. Blade 200$_1$ has been dug into the ground.

By applying a levering force F$_1$ on handle 300$_1$ sufficient to overcome ground resistance force R$_1$ on blade 200$_1$, the shovel rotates around axis A$_1$ until base end 20$_1$ contacts ground 400. In the process, the portion of ground 400 above blade 200$_1$ will be lifted to a limited degree but not very far.

In the second position of usage shown in FIG. 3, base end 20$_2$ has contacted the ground and aid 10$_2$ is set to provide bracing support. By applying a levering force F$_2$ on handle 300$_2$ sufficient to overcome ground resistance force R$_2$ on blade 200$_2$, the shovel begins to rotate around axis A$_2$. Since axis A$_2$ is positioned away from the blade rather than at the top of the blade like axis A$_1$, such rotation lifts the blade away from the ground ultimately to the position of blade 200$_3$.

In the third position of usage shown in FIG. 3, blade 200$_3$ is shown carrying a load 402 which has been lifted away from ground 400. The weight of this load is balanced by levering force F$_3$ applied to handle 300$_3$.

While the foregoing operation is simple, it is important to understand that a significant advantage over normal shoveling operations occurs when rotation begins around axis A$_2$. It is at this point where the full weight of load 402 first becomes imposed on the shovel blade. That weight, plus the added frictional resistance caused by ground consolidation and/or roots, fibres or the like which are in the ground must be overcome in order to lift load 402 away from the ground. Depending upon ground conditions, the effective weight may be significantly greater than the true weight of load 402 once it is separated from the ground. It can be much easier to lift the effective weight of the load by levering the shovel about axis A$_2$ than by grabbing the shovel low on handle 300$_2$ and trying to lift rather than lever.

It may be noted that the user has a smaller mechanical advantage when levering about axis A$_2$ than when levering about axis A$_1$. However, the advantage is still significant.

Once load 402 has been lifted away from the ground as shown in FIG. 3 in the third position of usage, then it may be carried away in one of two ways. It can be tossed aside in a conventional manner by lifting the entire shovel with the load (but with less lifting force than that required to remove the load from the ground), or it can be rotated away in a horizontal plane and simply dropped aside with very little additional work. Rotation is directed in a horizontal plane about axis A$_3$ shown in FIGS. 2 and 3, and is particularly useful when digging a shallow trench that later has to be filled in.

Figure 5:
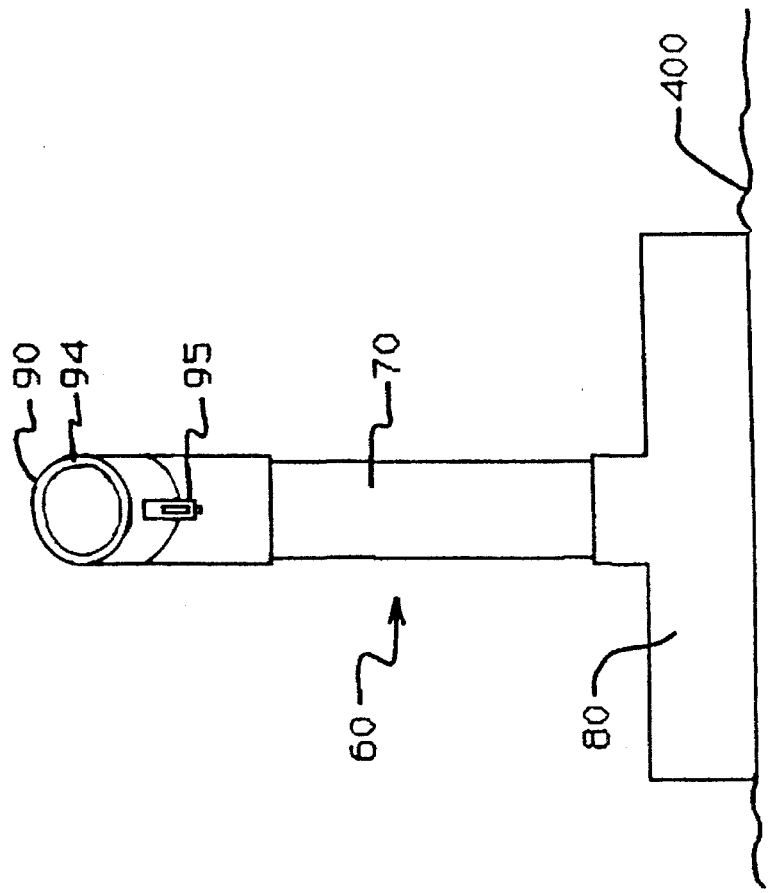
FIG. 5 is a side elevation view of the shoveling aid shown in FIG. 4.
Figure 4:
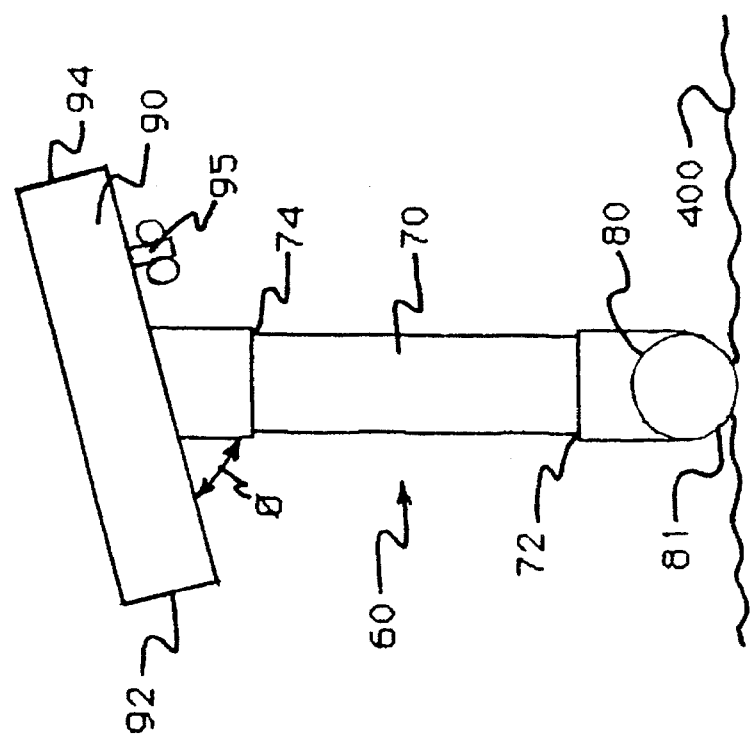
FIG. 4 is a front elevation view of another shoveling aid in accordance with the present invention.

FIGS. 4 and 5 illustrate another embodiment of the present invention. In these Figures, a shoveling aid generally designated 60 comprises first, second and third cylindrical pipe sections designated 70, 80 and 90 respectively.

As can be seen, second pipe section 80 is coupled transversely by means of a T-shaped intersection with lower end 72 of first pipe section 70. Likewise, third pipe section 90 is coupled at an angle φ to upper end 74 of first pipe section 70.

Typically, angle φ may be in the neighbourhood of 70° like angle Θ in the case of shoveling aid 10.

Pipe section 90 is open at both of its ends 92, 94 and is sized to longitudinally receive the handle of a shovel (not shown) such as shovel 100 illustrated in FIGS. 1 and 2. When the handle is received to a working position in pipe section 90, then it may be releasably secured at that position by tightening bolt 95 which operates in the same manner as bolt 55 of shoveling aid 10.

The operation of shoveling aid 60 is basically the same as the operation of shoveling aid 10. Pipe section 70 of shoveling aid 60 is a bracing member similar to pipe section 12 of shoveling aid 10, although of smaller diameter. Further, although it presents a different footprint than base end 20 of pipe section 12 of shoveling aid 10, transverse pipe section 80 of shoveling aid 60 may be viewed as a base end for pipe section 70.

Pipe section 80 of shoveling aid 60 presents a different footprint than base end 12 of shoveling aid 10 because its surface is cylindrical rather than a flat circular area. Its bottom or lower face 81 is convex relative to ground 400. Depending upon ground conditions, the convex curvature will permit the shoveling aid to roll on the ground when in use.

Various modifications and changes to the present invention that fall within the spirit and scope of the following claims are possible and will undoubtedly occur to those skilled in the art.

I claim:

1. For a shovel comprising a shovel blade and an elongated handle extending away from said blade, a shoveling aid comprising:
   (a) an elongated bracing member comprising a pipe section extending from a base end to a top end, said pipe section including upper and lower openings on opposed sides of said pipe section, said upper opening being positioned nearer to said top end than said lower opening; and,
   (b) means for attaching said bracing member to said handle at a selected position away from said blade to permit said shovel to be levered with said aid to lift a load carried by said blade, said attaching means comprising:
      (i) a sleeve coupled to said pipe section in said upper opening, said sleeve being sized and oriented to longitudinally receive said handle at a predetermined angle relative to said pipe section, said handle being longitudinally receivable through said openings and said sleeve to said selected position; and,
      (ii) means for releasably securing said handle in said sleeve at said selected position.

2. A shoveling aid as defined in claim 1, wherein said base end is closed.

3. A shoveling aid as defined in claim 2 wherein, said base end has a convex lower face.

\* \* \* \* \*